(12) United States Patent
Han et al.

(10) Patent No.: US 11,503,124 B1
(45) Date of Patent: Nov. 15, 2022

(54) MANAGING RESOURCE UTILIZATION IN EDGE-COMPUTING SYSTEMS

(71) Applicant: Red Hat, Inc., Raleigh, NC (US)

(72) Inventors: Sebastien Han, Marseilles (FR); Ricardo Noriega De Soto, Gorgonzola (IT); Huamin Chen, Westboro, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/326,648

(22) Filed: May 21, 2021

(51) Int. Cl.
| | |
|---|---|
| *H04L 67/2895* | (2022.01) |
| *H04L 67/00* | (2022.01) |
| *H04L 67/1031* | (2022.01) |
| *H04L 67/01* | (2022.01) |

(52) U.S. Cl.
CPC .......... *H04L 67/2895* (2013.01); *H04L 67/01* (2022.05); *H04L 67/1031* (2013.01); *H04L 67/34* (2013.01)

(58) Field of Classification Search
CPC . H04L 67/2895; H04L 67/01; H04L 67/1031; H04L 67/34
See application file for complete search history.

(56) References Cited

U.S. PATENT DOCUMENTS

| | | |
|---|---|---|
| 9,887,889 B1 | 2/2018 | Dippenaar |
| 10,915,382 B2 | 2/2021 | Zhang et al. |
| 10,938,677 B2 | 3/2021 | Shimamura et al. |
| 2010/0122313 A1* | 5/2010 | Ivgi ..................... G06F 21/6218 726/1 |
| 2011/0153678 A1* | 6/2011 | Matsubara ............ H04L 41/024 707/802 |
| 2015/0253991 A1* | 9/2015 | Nikaido ................ G06F 3/0649 711/114 |
| 2020/0280512 A1* | 9/2020 | Huddar .................... H04L 41/04 |
| 2021/0365414 A1* | 11/2021 | Lu .......................... G06F 3/0638 |
| 2021/0374151 A1* | 12/2021 | Huss ....................... G06F 9/465 |

(Continued)

OTHER PUBLICATIONS

Baresi, L., et al., "Towards a Serverless Platform for Edge Computing," ResearchGate, 2019, https://www.researchgate.net/publication/332104710_Towards_a_Serverless_Platform_for_Edge_Computing.

(Continued)

*Primary Examiner* — El Hadji M Sall
(74) *Attorney, Agent, or Firm* — Kilpatrick Townsend & Stockon LLP

(57) ABSTRACT

Resource utilization in edge-computing clusters and other computing clusters can be improved according to some aspects described herein. For example, an event handler can detect an event involving a state change to a data object. In response to detecting the event, the event handler can access an event registry storing relationships between a group of controllers and a group of events that are to be handled by the group of controllers. The event handler can determine, using the event registry, a controller that is configured to handle the event. The event handler can then transmit a command over a network to a computing cluster that includes a reconciler associated with the controller, where the command is for causing the reconciler to perform a reconciliation operation with respect to the data object. Separating the event-handling logic from the reconciliation logic in this way may improve resource utilization.

20 Claims, 4 Drawing Sheets

(56) References Cited

U.S. PATENT DOCUMENTS

2021/0409346 A1* 12/2021 Thoemmes ........... H04L 47/788

OTHER PUBLICATIONS

Nangare, S., "Serverless at the Edge: Resolving Resource Utilization Concerns," UK 5G Innovation Network, 2019, https://uk5g.org/5g-updates/read-articles/serverless-at-the-edge-resolving-resource-utilizat/.
Shafiei, H., "Serverless Computing: A Survey of Opportunities, Challenges and Applications," IEEE, 2019, https://arxiv.org/pdf/1911.01296.pdf.
Spazzoli, R., "Kubernetes Operators Best Practices," Red Hat, Inc., 2019, https://www.openshift.com/blog/kubernetes-operators-best-practices.

* cited by examiner

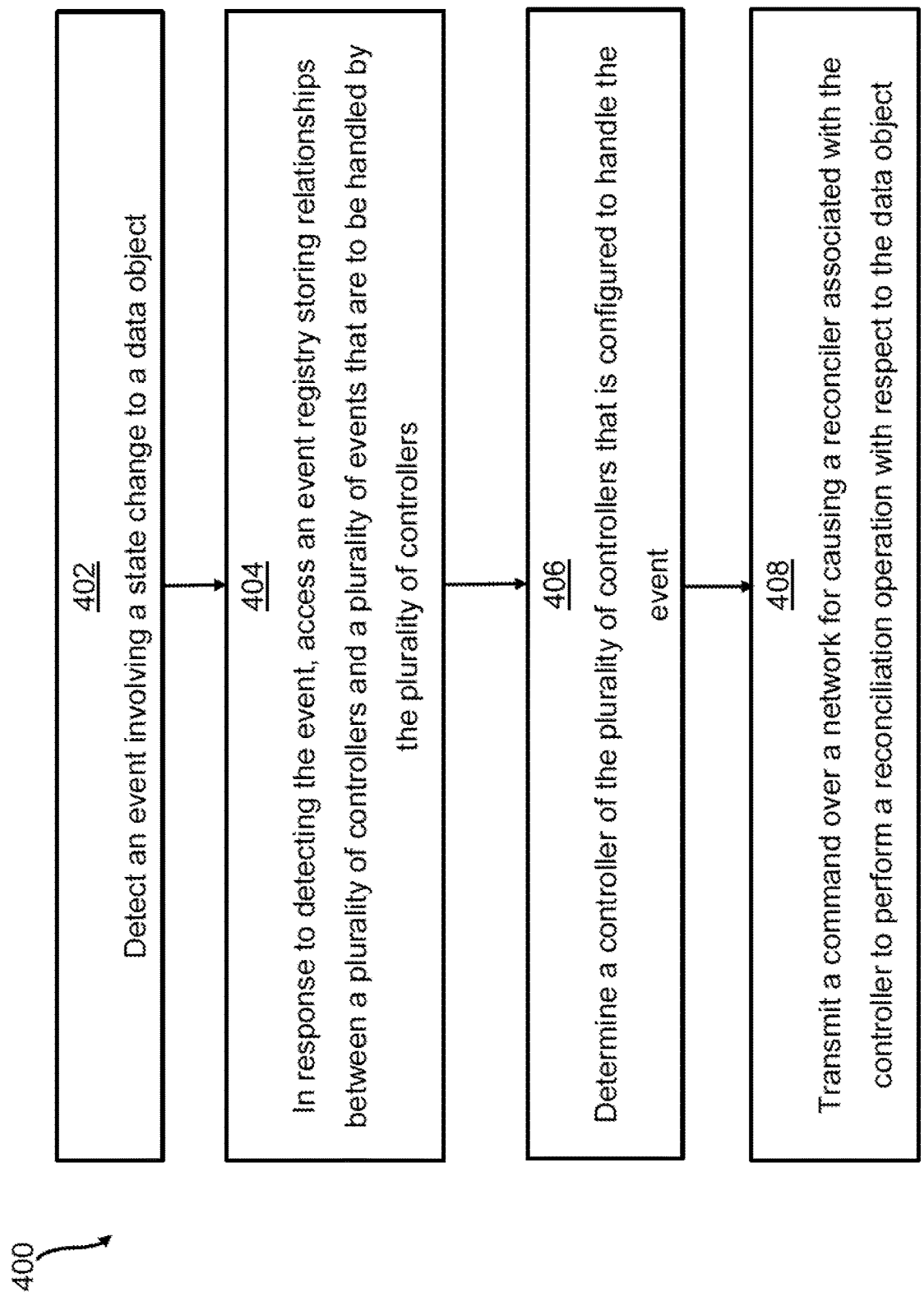

MANAGING RESOURCE UTILIZATION IN EDGE-COMPUTING SYSTEMS

TECHNICAL FIELD

The present disclosure relates generally to managing software resources. More specifically, but not by way of limitation, this disclosure relates to improving resource utilization in edge-computing systems and other types of computing systems.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage. Distributed computing environments may employ edge-computing clusters to perform various functions at the edge.

Kubernetes is one platform that can be deployed on a computing cluster such as an edge-computing cluster. Computing clusters that are running Kubernetes may be referred to as Kubernetes environments. Kubernetes can include operators for automating various repeatable tasks, such as deployment, scaling, and backup of software components. An operator is a software extension to Kubernetes that can manage an assigned software component, such as a data object or a stateful application. Once deployed, operators can create, configure, and manage instances of their assigned software components on behalf of a user in a declarative way. For example, an operator can monitor the state of a data object and perform one or more reconciliation operations in response to detecting a state change associated with the data object. While Kubernetes may use operators to perform the abovementioned functionality, other types of controller software may be employed in other contexts to restart, upgrade, scale, monitor, and manage the health of the data objects (e.g., automatically based on prescribed policies).

BRIEF DESCRIPTION OF THE DRAWINGS

FIG. 4 a flow chart of an example of a process performed by a processing device executing an event handler according to some aspects of the present disclosure.

DETAILED DESCRIPTION

Figure 1:
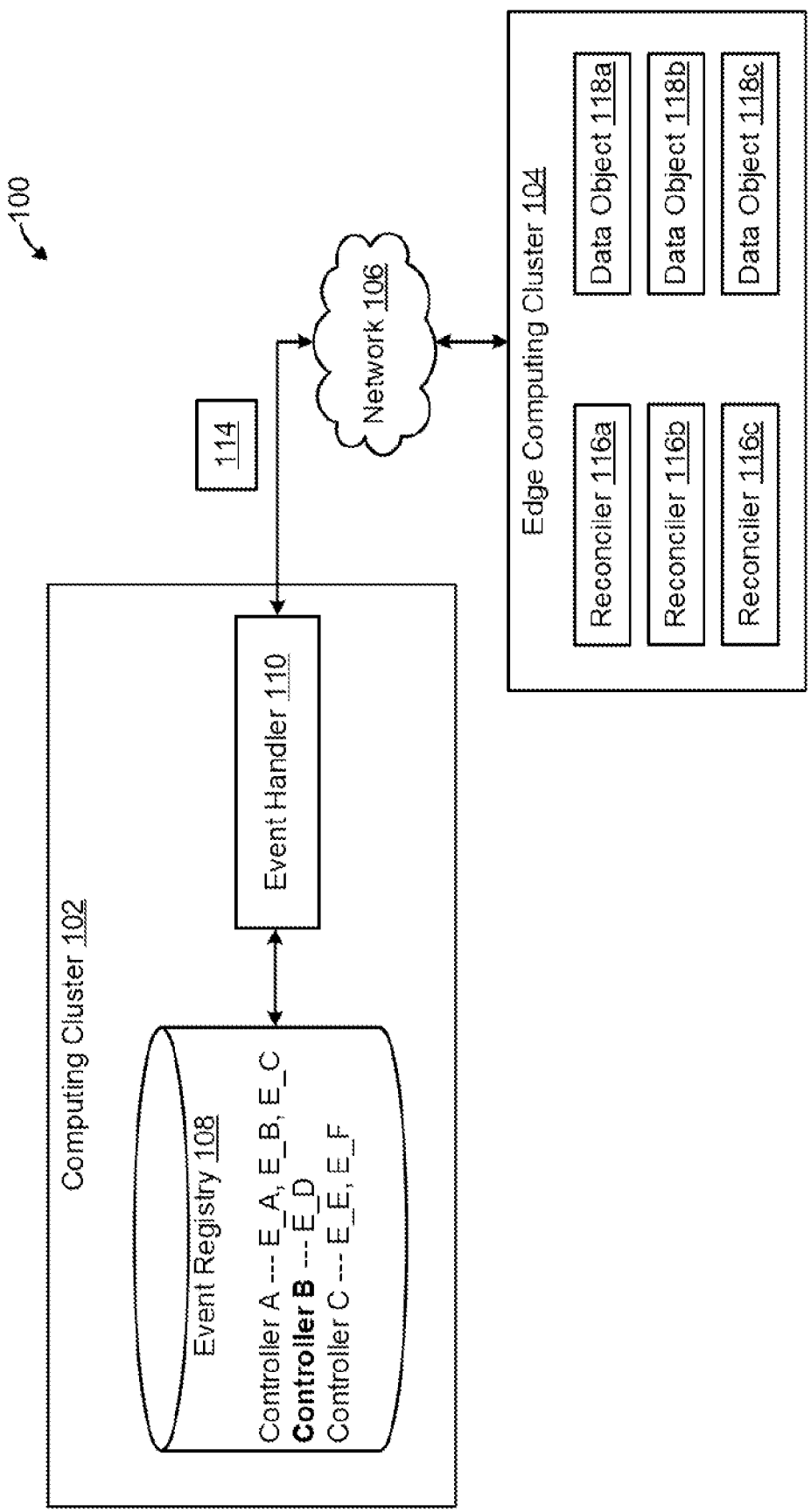
FIG. 1 is a block diagram of an example of a distributed computing system according to some aspects of the present disclosure.

A distributed computing system can include controller software (e.g., operators in a Kubernetes environment) to manage the lifecycles of data objects and ensure consistent behavior of data objects across applications. But the controller software can add to the load of the edge-computing cluster. This can be problematic because edge-computing clusters are resource-constrained systems with limited computing resources (e.g., processing power and memory). Controller software can drain the limited computing resources away from the main functionality of the edge-computing cluster, negatively impacting the performance of the edge-computing cluster. For example, an operator executing in the edge-computing cluster can include monitoring logic and reconciliation logic. The operator can execute the monitoring logic to detect state change events associated with the data objects and execute the reconciliation logic to achieve a desired state for the data objects. The monitoring logic can consume a large amount of resources in a way that competes with the edge-computing cluster's application workload, reducing the usability of edge-computing cluster. Similar problems can arise outside the context of edge-computing clusters with respect to any other computing cluster having limited computing resources.

Some examples of the present disclosure can overcome one or more of the abovementioned problems by decoupling the controller logic into separate event handlers and reconcilers that run independently of each other. The event handlers can include the monitoring logic and the reconcilers can include the reconciliation logic. The event handlers and reconcilers can be located in different areas of the distributed computing system to allocate resources more efficiently. For example, the event handlers can be located outside an edge-computing cluster, and communicate with reconcilers located inside the edge-computing cluster, so that the event handlers do not consume the computing resources of the edge-computing cluster during operation. Alternatively, the event handlers can be located inside the edge-computing cluster, and communicate with reconcilers located outside the edge-computing cluster, so that the reconcilers do not consume the computing resources of the edge-computing cluster during operation. Either way, the event handlers can monitor events associated with data objects to determine when a reconciliation operation is necessary, at which point the event handlers can transmit communications for causing the reconcilers to perform the reconciliation operation. Separating the event handlers from the reconcilers, rather than having them both in the same operator (e.g., the same software program), can allow for greater deployment flexibility and may allow for updates to be more easily made to the event handlers and the reconcilers.

In some examples, the reconcilers can be serverless functions or microservices that can be easily scaled down when not in use. A serverless function can be an ephemeral, self-contained, discrete piece of code (e.g., set of logic or operations) configured to perform a particular task when executed and then become dormant when execution completes. Scaling down the reconcilers may minimize memory consumption by the reconcilers until a reconciliation operation is needed, as determined, for example, by the event handler. This can reduce the memory and processing footprint of the reconcilers.

Many different arrangements of the event handlers and reconcilers are possible. In some examples, the event handler can be located inside the distributed computing environment but outside the edge-computing cluster, while the reconcilers and data objects are located inside the edge-computing cluster. Alternatively, the reconcilers can be located inside the distributed computing environment but outside the edge-computing cluster, while the event handler and data objects are located in the edge-computing cluster. In either arrangement, the event registry can be located either inside the edge-computing cluster or outside the edge-computing cluster and elsewhere in the distributed computing system. Other configurations of the reconcilers, data objects, event handlers, and event registry are also possible.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 is a block diagram of an example of a distributed computing system 100 according to some aspects of the present disclosure. The distributed computing system 100 can include a computing cluster 102 communicatively coupled to an edge-computing cluster 104 via a network 106, such as a local area network or the Internet. The computing cluster 102 can include an event registry 108 and an event handler 110.

The edge-computing cluster 104 can include reconcilers 116a-c and data objects 118a-c. In some examples, the reconcilers 116a-c can be serverless functions, microservices, or other software that may be scaled up or down depending on a load. The data objects 118a-c can be any suitable type of data object. For example, the data object 118a can be a custom resource object in a Kubernetes environment. A custom resource object can be a special type of resource object that is generally unavailable in Kubernetes by default and that has one or more characteristics specified in a custom resource definition. In the context of Kubernetes, a resource object can be an application programming interface (API) object that has one or more characteristics specified in a resource definition. Such custom resource objects and custom resource definitions can be subsequently added to a Kubernetes installation, for example to extend the Kubernetes API.

In some examples, the event handler 110 can monitor the data objects 118a-c located in the edge-computing cluster 104 for events involving a state change to a data object 118b. Other types of events may additionally or alternatively be detected by the event handler 110. When the event handler 110 is located outside of the edge-computing cluster 104 including the data object 118b, it can use the network 106 to detect an event. When an event occurs, the edge-computing cluster 104 can transmit a signal via the network 106 to the event handler 110, causing the event handler 110 to detect the event. Upon detecting such an event, the event handler 110 can access the event registry 108 to determine a controller corresponding to the event. Events can be mapped to various controllers in the event registry 108. More specifically, the event registry 108 can include relationships between one or more controllers (e.g., Controllers A-C) and one or more events associated with the controllers. The events are represented in FIG. 1 as "E_X," where "E" stands for "event" and "X" is an event label. For example, Controller B can be mapped to event E_D. The event handler 110 can determine that the detected event E_D corresponds to Controller B using the event registry 108.

After determining which controller is associated with the event, the event handler 110 can determine which of the reconcilers 116a-c is to handle the reconciliation operation. To do so, the event handler 110 may refer to the event registry 108 or another database, which can include relationships between the Controllers A-C and the reconcilers 116a-c. The event handler 110 can access these relationships to determine which of the reconcilers 116a-c corresponds to the identified controller. For example, the event handler 110 can use the relationships to determine that a particular reconciler 116b corresponds to the Controller B. Having determined the particular reconciler 116b corresponds to Controller B, the event handler 110 can generate and transmit a command 114 to the edge-computing cluster 104 for causing that particular reconciler 116b to execute a reconciliation operation with respect to data object 118b.

After receiving the command 114 from the event handler 110, the edge-computing cluster 104 can determine if the specific reconciler 116b is already running. If the specific reconciler 116b is not already running, the edge-computing cluster 104 can deploy the specified reconciler 116b to perform the reconciliation operation. Deploying a reconciler 116 can involve running a new instance of the reconciler 116. The new instance of the reconciler 116 can then execute the reconciliation operation, for example by reconfiguring the data object 118b associated with the event to have a target state. On the other hand, if the specific reconciler 116b is already running, the edge-computing cluster 104 can use the already running instance of the reconciler 116b to execute the reconciliation operation.

In some examples, the reconciliation operation can involve the reconciler 116b determining a difference between the current state of the data object 118b and the target state, and reconciling the difference. For example, if the target state is to have more storage nodes, the reconciler 116b can reconcile the difference in states by creating more storage nodes. Alternatively, if the target state is to generate a new data object (e.g., data object 118c), the reconciler 116b can perform a reconciliation operation that includes generating the new data object 118c. After the reconciliation operation is performed, the reconciler 116b can register one or more events E_X (e.g., E_E, E_F) associated with the new data object 118d to a controller (e.g., Controller C) in the event registry 108. After the difference in states is reconciled, the edge-computing cluster 104 can shut down the reconciler 116b until another reconciliation operation is needed, so that it does not consume resources.

Although FIG. 1 depicts a certain number and arrangement of components, this is for illustrative purposes and intended to be non-limiting. Other examples may include more components, fewer components, different components, or a different arrangement of the components shown in FIG. 1. It will also be appreciated that similar principles can be applied with respect to non-edge clusters (e.g., as a replacement for edge-computing cluster 104) in other examples.

Figure 2:
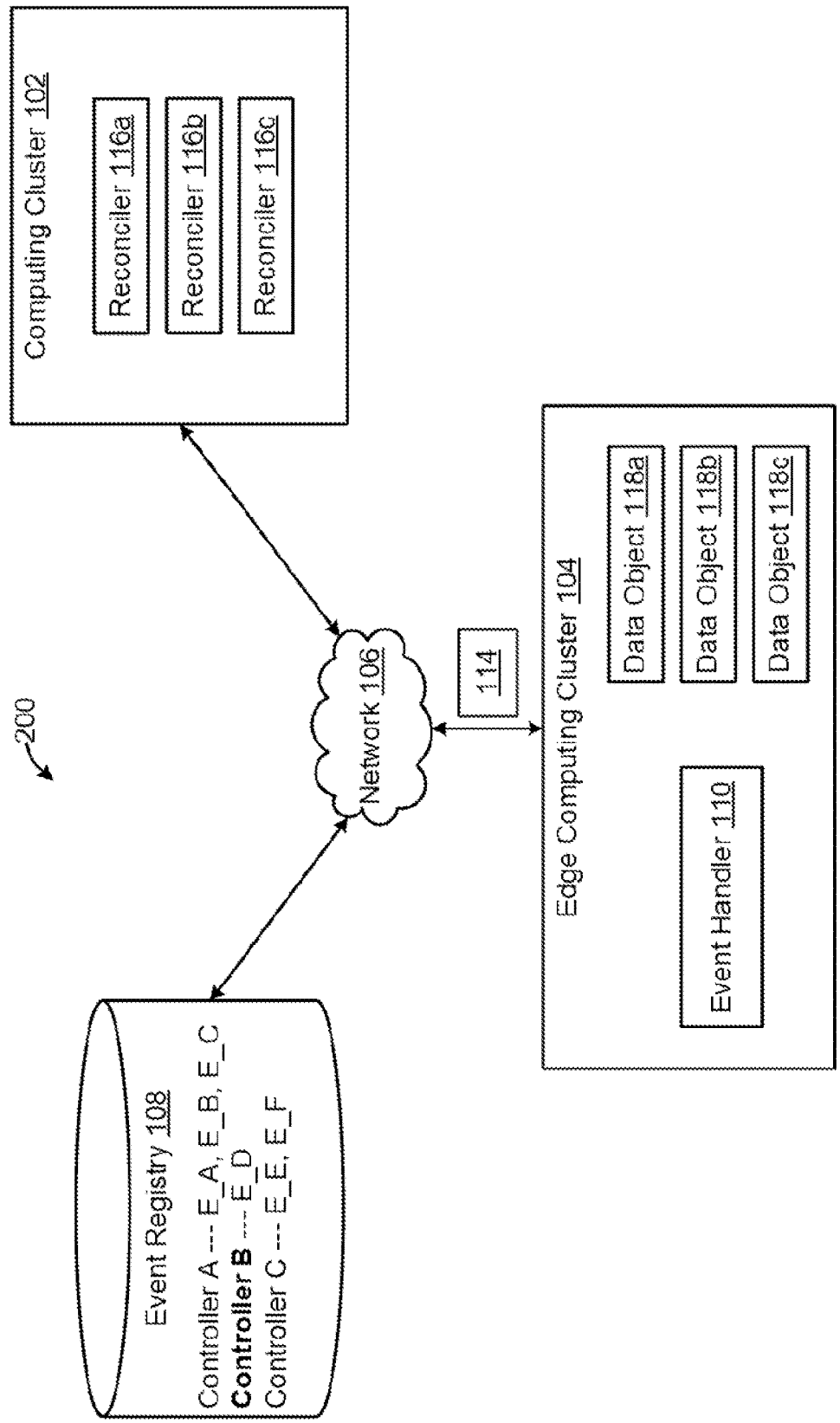
FIG. 2 is a block diagram of another example of a distributed computing system according to some aspects of the present disclosure.

FIG. 2 is a block diagram of another example of a distributed computing system 200 according to some aspects of the present disclosure. The distributed computing system 200 can include an edge-computing cluster 104 communicatively coupled to a computing cluster 102 via a network 106, such as a local area network or the Internet. The distributed computing system 200 can also include an event registry 108. The event registry 108 can be located in the edge-computing cluster 104, the computing cluster 102, or elsewhere internally or externally to the distributed computing system 200. The system 200 can be configured to perform some or all of the functionality described above.

In the example shown in FIG. 2, the edge-computing cluster 104 includes the event handler 110 and the computing cluster 102 includes the reconcilers 116a-c, which is generally opposite to the arrangement shown in FIG. 1. The event handler 110 can interact with the event registry 108 and the reconcilers 116a-c via the network 106.

In some examples, the event handler 110 can monitor the data objects 118a-c located in the edge-computing cluster 104 for events involving a state change to a data object 118b.

In response to detecting such an event, the event handler 110 can determine which of the Controllers A-C is associated with the event by accessing the event registry 108. For example, the event handler 110 can determine that Controller C corresponds to the event. The event handler 110 can then determine, based on the identified controller, which of the reconcilers 116a-c is to perform a reconciliation operation for the data object 118b. The event handler 110 can transmit a command 114 via the network 106 to the computing cluster 102 (e.g., to the selected reconciler therein) for causing the selected reconciler 116b to execute the reconciliation operation for data object 118b.

Figure 3:
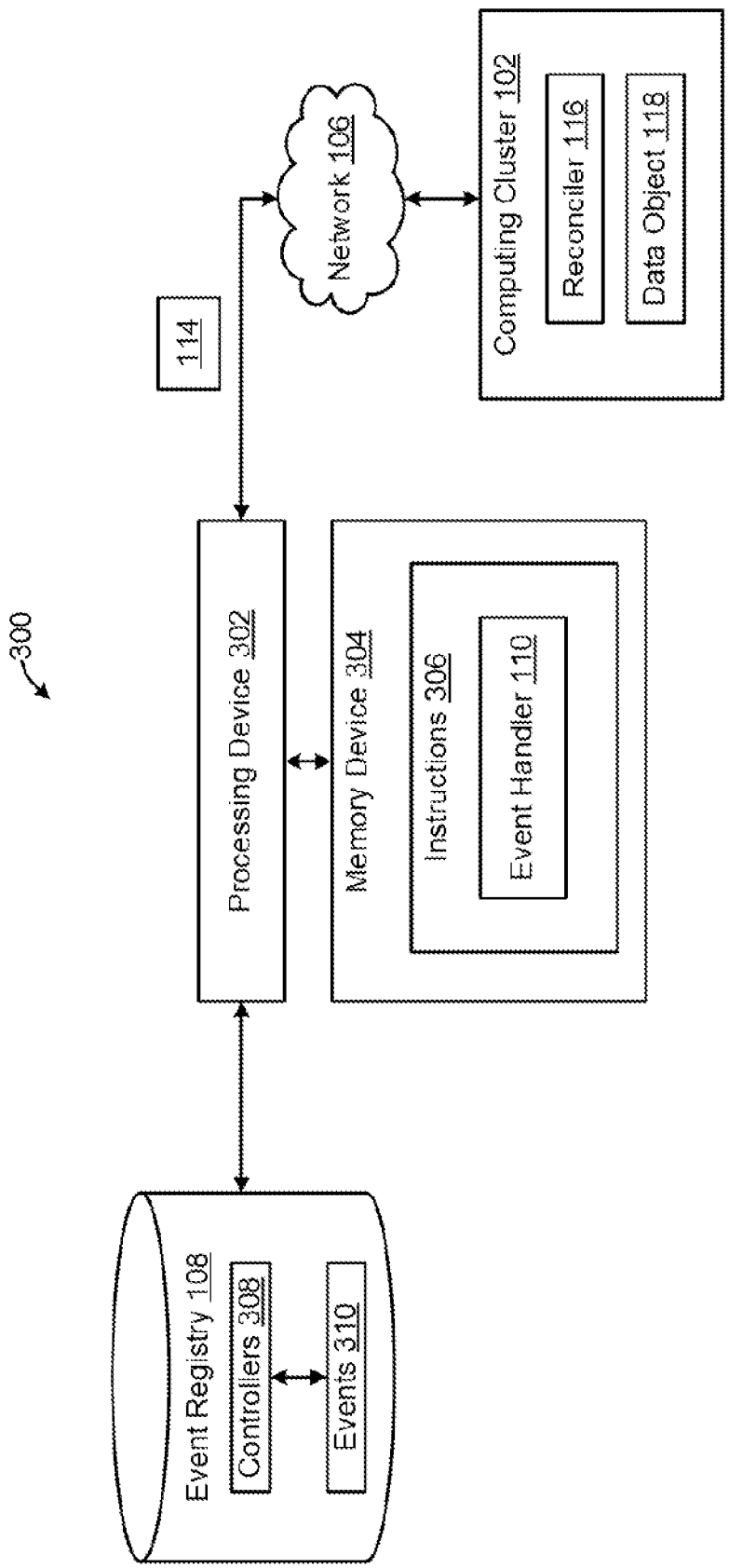
FIG. 3 is a block diagram of an example of a system according to some aspects of the present disclosure.

FIG. 3 is a block diagram of an example of a system 300 according to some aspects of the present disclosure. The system 300 includes a processing device 302 that is communicatively coupled to a memory device 304 and an event registry 108. In some examples, the processing device 302 and the memory device 304 can be part of the same computing device. In other examples, the processing device 302 and the memory device 304 can be distributed from (e.g., remote to) one another.

The processing device 302 can include one processor or multiple processors. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. The instructions 306 may include processor-specific instructions generated by a compiler or an interpreter from code written in any suitable computer-programming language, such as C, C++, C#, etc. In some examples, the instructions 306 can correspond to an event handler 110.

The memory device 304 can include one memory or multiple memories. The memory device 304 can be non-volatile and may include any type of memory that retains stored information when powered off. Non-limiting examples of the memory device 304 include electrically erasable and programmable read-only memory (EEPROM), flash memory, or any other type of non-volatile memory. At least some of the memory device 304 can include a non-transitory computer-readable medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

The processing device 302 can execute the instructions 306 to perform operations. For example, the processing device 302 can detect an event involving a state change to a data object 118. In some examples, the processing device 302 can detect events using the network 106. When an event occurs, the computing cluster 102 can transmit a signal via the network 106 to the processing device 302, causing the processing device 302 to detect the event.

The processing device 302 can then access an event registry 108 storing relationships between a plurality of controllers 308 and a plurality of events 310 that are to be handled by the plurality of controllers 308. One or more events 310 may corresponds to each controller of the plurality of controllers 308. The processing device 302 can determine, using the event registry 108, a controller of the plurality of controllers 308 that is configured to handle the event 310. A reconciler 116 may be associated with each controller of the plurality of controllers 308. The processing device 302 can then transmit a command 114 via the network 106 to the computing cluster 102. The command 114 can be configured to cause a reconciler 116 associated with the controller 308 to perform a reconciliation operation with respect to the data object 118.

FIG. 4 is a flow chart of an example of a process 400 performed by a processing device executing an event handler 110 according to some aspects of the present disclosure. Other examples can include more steps, fewer steps, different steps, or a different order of the steps than is shown in FIG. 4. The steps of FIG. 4 are discussed below with reference to the components discussed above in relation to FIG. 3.

In block 402, a processing device 302 detects an event involving a state change to a data object 118. The processing device 302 can be continuously monitoring the data object 118 for state changes until an event can be detected. In some examples, the processing device 302 can be located in a same computing cluster 102 as the data object. Alternatively, the processing device 302 can be located in a different computing cluster than the data object 118, and the processing device 302 can monitor the data object 118 for state changes via a network 106. Other types of events may additionally or alternatively be detected by the processing device 302.

In block 404, the processing device 302 accesses an event registry 108 storing relationships between a plurality of controllers 308 and a plurality of events 310 that are to be handled by the plurality of controllers 308, in response to detecting the event. In some examples, the processing device 302 can be located in the same computing cluster 102 as the event registry 108. In other examples, the processing device 302 can be located in a different computing cluster 102 than the event registry 108 and can be communicatively coupled via a network 106 to the event registry 108.

In block 406, the processing device 302 determines, using the event registry 108, a controller of the plurality of controllers 308 that is configured to handle the event. Each controller of the plurality of controllers 308 can be associated with one or more events 310 in the event registry 108, such as events involving state changes to data objects 118. Each controller 308 can also be associated with a reconciler 116 that can perform a reconciliation operation with respect to the data object 118. The event handler 110 can determine which controller 308 is associated with the detected event, and then determine which reconciler 116 is associated with that controller 308.

In block 408, the processing device 302 transmits a command 114 over a network 106 for causing the reconciler 116 associated with the controller 308 to perform a reconciliation operation with respect to the data object 118. The command 114 can be received by the reconciler 116 or a computing cluster 102 that includes the reconciler 116. In some examples, the reconciliation operation can involve the reconciler 116 determining a difference between the current state and target state of the data object 118. The reconciliation operation can then involve the reconciler 116 reconciling the difference between the current state and target state of the data object 118.

In some examples, the reconciler 116 and data object 118 may not be located in the same computing cluster 102. For example, the reconciler 116 may be located in a computing cluster 102 that is separate from an edge-computing cluster 104 that includes the data object 118. In that case, the reconciler 116 can transmit a command 114 via a network 106 from the computing cluster 102 to the edge-computing cluster 104 to perform the reconciliation operation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a processing device; and
   a memory device including instructions for an event handler that is executable by the processing device to:
      detect an event involving a state change to a data object;
      in response to detecting the event, access an event registry storing relationships between a plurality of controllers and a plurality of events that are to be handled by the plurality of controllers;
      determine, using the event registry, a controller of the plurality of controllers that is configured to handle the event; and
      transmit a command over a network to a computing cluster that includes a reconciler associated with the controller for causing the reconciler to perform a reconciliation operation with respect to the data object.

2. The system of claim 1, wherein the reconciliation operation involves:
   determining a difference between a current state of the data object and a target state of the data object; and
   reconciling the difference between the current state of the data object and the target state of the data object.

3. The system of claim 1, wherein the data object is a custom resource object in a Kubernetes environment and the controller is an operator in the Kubernetes environment.

4. The system of claim 1, wherein the computing cluster is an edge-computing cluster that also includes the data object, and wherein the event handler and the event registry are located remotely from the edge-computing cluster.

5. The system of claim 4, wherein the reconciler is a serverless function.

6. The system of claim 5, wherein the instructions are further executable by the processing device for causing the processing device to transmit the command over the network to the edge-computing cluster, the edge-computing cluster being configured to receive the command and responsively (i) use an already running instance of the serverless function to execute the reconciliation operation or (ii) instantiate a new instance of the serverless function to execute the reconciliation operation.

7. The system of claim 1, wherein the event handler and the data object are located on an edge-computing cluster, and wherein the reconciler is located remotely from the edge-computing cluster.

8. The system of claim 1, wherein the reconciliation operation involves generating a new data object, and wherein the reconciler is configured to register one or more events associated with the new data object to the controller in the event registry.

9. The system of claim 1, wherein the instructions are further executable by the processing device for causing the processing device to select the reconciler from among a plurality of reconcilers based on the controller.

10. A method comprising:
    detecting, by a processing device executing an event handler, an event involving a state change to a data object;
    in response to detecting the event, accessing, by the processing device, an event registry storing relationships between a plurality of controllers and a plurality of events that are to be handled by the plurality of controllers;
    determining, by the processing device, a controller of the plurality of controllers that is configured to handle the event; and
    transmitting, by the processing device, a command over a network to a computing cluster that includes a reconciler associated with the controller for causing the reconciler to perform a reconciliation operation with respect to the data object.

11. The method of claim 10, wherein the reconciliation operation involves:
    determining, by the reconciler, a difference between a current state of the data object and a target state of the data object; and
    reconciling, by the reconciler, the difference between the current state of the data object and the target state of the data object.

12. The method of claim 10, wherein the data object is a custom resource object in a Kubernetes environment and the controller is an operator in the Kubernetes environment.

13. The method of claim 10, wherein the computing cluster is an edge-computing cluster that also includes the data object, and wherein the event handler and the event registry are located remotely from the edge-computing cluster.

14. The method of claim 13, wherein the reconciler is a serverless function or a microservice.

15. The method of claim 14, further comprising transmitting the command over the network to the edge-computing cluster, the edge-computing cluster being configured to receive the command and responsively (i) use an already running instance of the serverless function to execute the reconciliation operation or (ii) instantiate a new instance of the serverless function to execute the reconciliation operation.

16. The method of claim 10, wherein the event handler and the data object are located on an edge-computing cluster, and wherein the reconciler is located remotely from the edge-computing cluster.

17. The method of claim 10, wherein the reconciliation operation involves generating a new data object, and wherein the reconciler is configured to register one or more events corresponding to the new data object and the controller in the event registry.

18. The method of claim 10, further comprising selecting the reconciler from among a plurality of reconcilers based on the controller.

19. A non-transitory computer-readable medium comprising program code for an event handler that is executable by a processing device for causing the processing device to:
    detect an event involving a state change to a data object;
    in response to detecting the event, access an event registry storing relationships between a plurality of controllers and a plurality of events that are to be handled by the plurality of controllers;
    determine, using the event registry, a controller of the plurality of controllers that is configured to handle the event; and transmit a command over a network to a computing cluster that includes a reconciler associated with the controller for causing the reconciler to perform a reconciliation operation with respect to the data object.

20. The non-transitory computer-readable medium of claim 19, wherein the computing cluster is an edge-computing cluster that also includes the data object, and wherein the event handler and the event registry are located remotely from the edge-computing cluster.

* * * * *